United States Patent [19]

Martin

[11] Patent Number: 5,085,372
[45] Date of Patent: Feb. 4, 1992

[54] MANURE SPREADERS

[75] Inventor: Mervin G. Martin, Myerstown, Pa.

[73] Assignee: Hedlund Manufacturing Co., Inc., Boyceville, Wis.

[21] Appl. No.: 443,013

[22] Filed: Nov. 28, 1989

Related U.S. Application Data

[60] Division of Ser. No. 310,046, Oct. 9, 1981, Pat. No. 4,993,632, which is a continuation-in-part of Ser. No. 170,034, Jul. 10, 1980, abandoned, and a continuation-in-part of Ser. No. 172,976, Jul. 28, 1980, Pat. No. 4,362,272.

[51] Int. Cl.⁵ ............................................. A01C 23/00
[52] U.S. Cl. ................... 239/675; 239/676; 239/679; 239/662; 198/311
[58] Field of Search ............... 366/186; 198/660, 670, 198/672, 657, 311; 239/672, 675, 676, 679, 681, 682, 662; 222/233, 234, 404, 407

[56] References Cited

U.S. PATENT DOCUMENTS

| | | | |
|---|---|---|---|
| 365,519 | 6/1887 | Hotham | 239/675 |
| 2,489,801 | 11/1949 | Myott | 239/683 |
| 3,025,067 | 3/1969 | Raney et al. | 239/658 |
| 3,197,075 | 7/1965 | Hansen | 198/660 |
| 3,236,527 | 2/1966 | Snyder . | |
| 3,295,855 | 1/1967 | Sadler et al. | 239/681 |
| 3,420,452 | 1/1969 | Vaughn | 239/675 |
| 3,765,526 | 10/1973 | Hubbard et al. . | |
| 3,964,714 | 6/1976 | Crawford et al. | 239/672 |
| 4,117,920 | 10/1978 | Oury | 198/311 |
| 4,362,272 | 12/1982 | Martin | 239/675 |
| 4,475,692 | 10/1984 | Walley . | |

FOREIGN PATENT DOCUMENTS

| | | | |
|---|---|---|---|
| 663873 | 5/1963 | Canada . | |
| 688394 | 3/1953 | United Kingdom . | |
| 1153106 | 5/1969 | United Kingdom | 198/657 |

Primary Examiner—Andres Kashnikow
Assistant Examiner—Christopher G. Trainor
Attorney, Agent, or Firm—Emrich & Dithmar

[57] ABSTRACT

A manure spreader that includes a generally V-shaped hollow body having a longitudinally positioned auger conveyor rotatively carried near its bottom which can be raised or lowered to break up manure that may bridge over the auger conveyor. The auger conveyor has a set of individual blades arranged in a helix to force the manure toward an outlet gate which is positioned at one end of the body. A rotary impeller comprised of a set of free swinging manure blades is carried outwardly of the body in a position to receive and propel the manure from the outlet gate while a suitable drive mechanism is provided to rotate the impeller at sufficient speed so the free swinging blades extend radially outward to spread the manure over the a wide area. Also disclosed is a chain drive for the auger and for the impeller which permits raising and lowering of the auger and enables the auger and expeller to rotate in opposite directions in achieving an overhand discharge motion for the expeller.

7 Claims, 5 Drawing Sheets

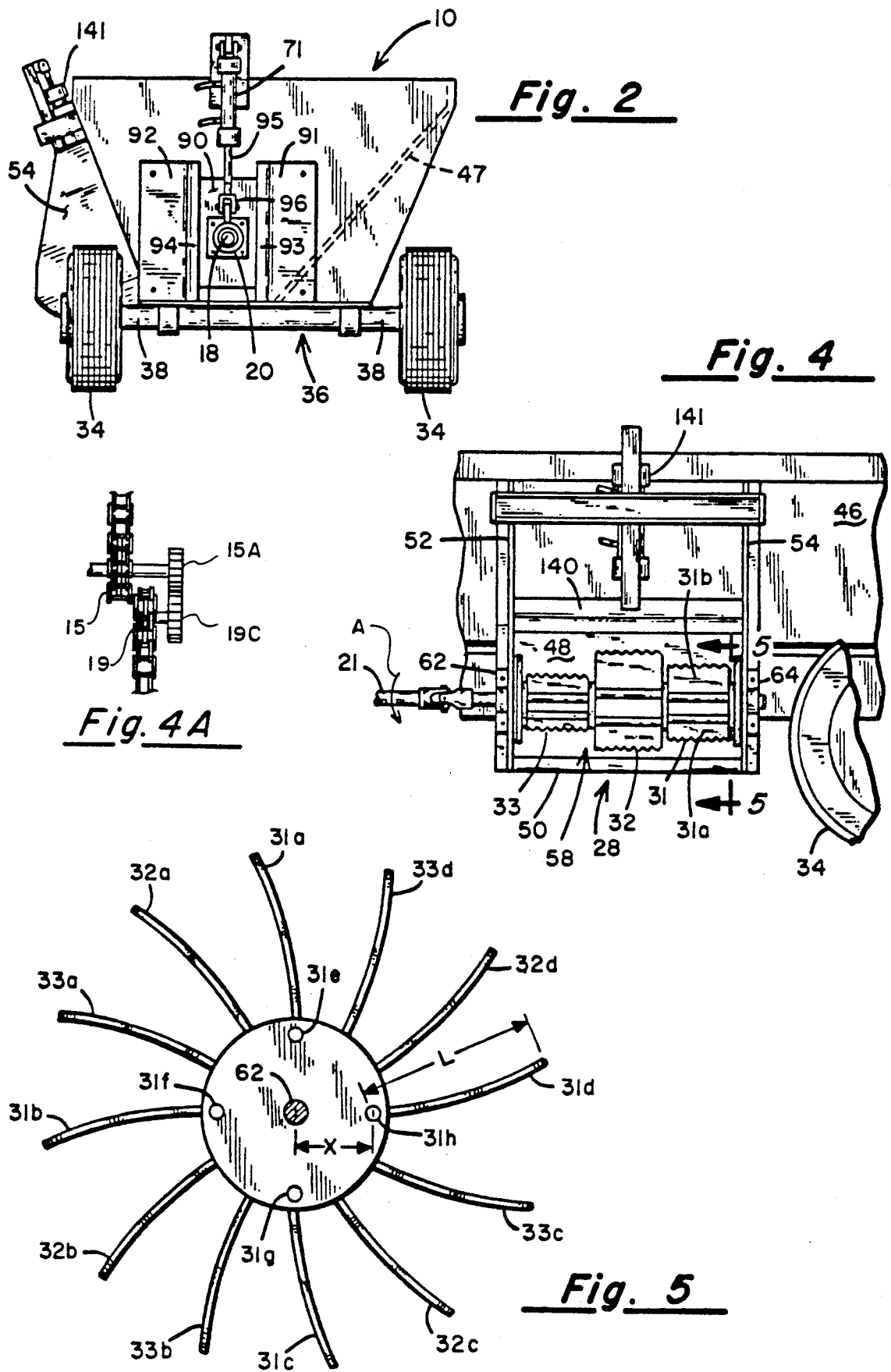

MANURE SPREADERS

CROSS REFERENCE TO RELATED APPLICATIONS

This application is a divisional application of co-pending U.S. application Ser. No. 06/310,046, filed Oct. 9, 1981, entitled "MANURE SPREADERS" now U.S. Pat. No. 4,993,632 which is a continuation-in-part of my corresponding U.S. patent application Ser. No. 170,034 filed July 10, 1980 titled "Manure Spreader" now abandoned and a continuation-in-part of my co-pending U.S. patent application U.S. Ser. No. 172,976 filed July 28, 1980 titled "Manure Spreader with Multiple Side Auger" now U.S. Pat. No. 4,362,272.

BACKGROUND OF THE INVENTION

This invention relates generally to manure spreaders and, more particularly, to manure spreaders for spreading chunks of hard-packed manure.

Many types of spreaders have been developed to utilize the fertilizer value of manure from farm animals such as dairy cattle or feeding cattle. The prior art manure spreaders include flail type spreaders with rotating aprons or movable gates. These types of spreaders are generally most commonly employed for with non-liquid manures. Still other workers in the art have developed spray type spreaders which employ tanks, hoses and accessory equipment to effectively distribute liquid manures. Such liquid type manures usually must be processes to add sufficient water to permit use with spray equipment. Both flail type spreaders and spray type spreaders have been generally and widely utilized in the past and both types are quite common. However, certain operating difficulties and inefficiencies have arisen with the presently available spreading equipment due to the nature of the manures available for distribution. For example, spreaders designed for solid application, such as the flail type spreader, cannot readily be employed for use with liquid manures. Also, because of the load characteristics inherent when spreading solid type manures, the prior art flail type spreader had to be ruggedly constructed and all parts had to be designed of increased strength to handle the solid manures. Despite the increased structural strength built into the flail type spreaders, there has been evidence of considerable wear and breakage, such as bearing wear, chain breakage and mechanical damage to the operating parts due to the nature of the solid manures. In addition, the spreaders that handle the solid type manures have the drawback of not being capable of handling or spreading liquid type manures.

In the case of prior art liquid type spreaders, the presently available prior art types incorporate a tank-like body which is suitable for use in the spreading of liquid manures.

Two types of manure spreaders for handling various types of manure which in consistency from liquids to semi-solids are described in my aforementioned patent applications. Although my manure spreaders work exceedingly well with practically all types of manure, there are occasions when spreading certain types of manure such as chunks of feed lot manure which may produce bridging over the conveyor in the spreader. The present invention permits one to break up the manure chunks that bridge over the conveyor to insure that the whole load of manure can be quickly and easily spread.

The problem encountered with spreading chunks of solid manure is that the consistency of the manure may be so thick or dense that it can be only loaded in the spreader in large chunks or solid clumps. This is particularly true of manure that accumulates in animal feeding pens. As the animals step on the manure and bedding, they compact the manure and bedding into an almost solid mass of compacted manure which tenaciously adheres to itself in a single mat the size of the feeding pen. To load compacted manure into a spreader one uses a manure loader that literally tears off huge chunks of manure which are then dumped in the manure spreader. As such hard-packed manure is very dense and heavy, its own weight causes the manure to pack itself into the manure spreader. As the chunks of hard-packed manure fall into the spreader, the manure may compact into a self-supporting solid mass which cannot be augered or pulled out of the spreader, i.e., the manure in the proximity of the auger conveyor blades can be physically forced out of the spreader but the manure beyond the reach of the auger conveyor blades forms a self-supporting bridge over the auger conveyor blades. In this condition the auger conveyor actually forms a tunnel underneath the manure in the spreader. The present invention provides an improvement to manure spreaders to permit one to spread manure regardless of the consistency of the manure by enabling the operator to pull solid chunks or clumps of hard-packed manure into an auger conveyor where the clumps can be cut up and fed to an impeller that spreads the manure on a field.

Aside from the occasional problem of handling hard-packed or compacted manure, there are farmers who use their manure spreader in both the winter and summer months. If the manure spreader is left outside during the winter months, oftentimes even though the spreader is completely emptied, there may be sufficient manure and liquid residue on the moving parts of the spreader to permit the moving parts of the spreader to freeze to the spreader, thus rendering the spreader inoperable. If the moving parts on the spreader are frozen, one can easily break the spreader by attempting to free the spreader by unknowingly applying power to the frozen spreader. The present invention provides an improvement to the manure spreaders so that the spreaders can be used in winter time without concern that the spreader parts may freeze up.

SUMMARY OF THE INVENTION

Briefly, the present invention comprises a manure spreader having a tank and an auger conveyor for augering compacting manure from the tank. The manure spreader includes a bridge break up mechanism that includes an auger conveyor that slidable mounts in the spreader to permit raising and lowering of the auger to break up manure that bridges over the conveyor. A side spreading mechanism connected to the manure spreader includes hinged manure blades that expel the manure as well as pivot to permit disgorging of rocks or frozen manure without damaging the blades. The hinged manure blades permit the manure blades to be propped up to prevent manure blade freeze up in winter.

BRIEF DESCRIPTION OF THE DRAWINGS

FIG. 2 is a rear view of the manure spreader of the present invention;

FIG. 4 is a side elevational view showing the side spreading mechanism;

FIG. 4A is a fragmentary top view showing the reversing drive mechanism for the expeller;

FIG. 5 is an enlarged, cross sectional view taken along line 5—5 on FIG. 4 looking in the direction of the arrows;

DESCRIPTION OF THE PREFERRED EMBODIMENT

Figure 1:
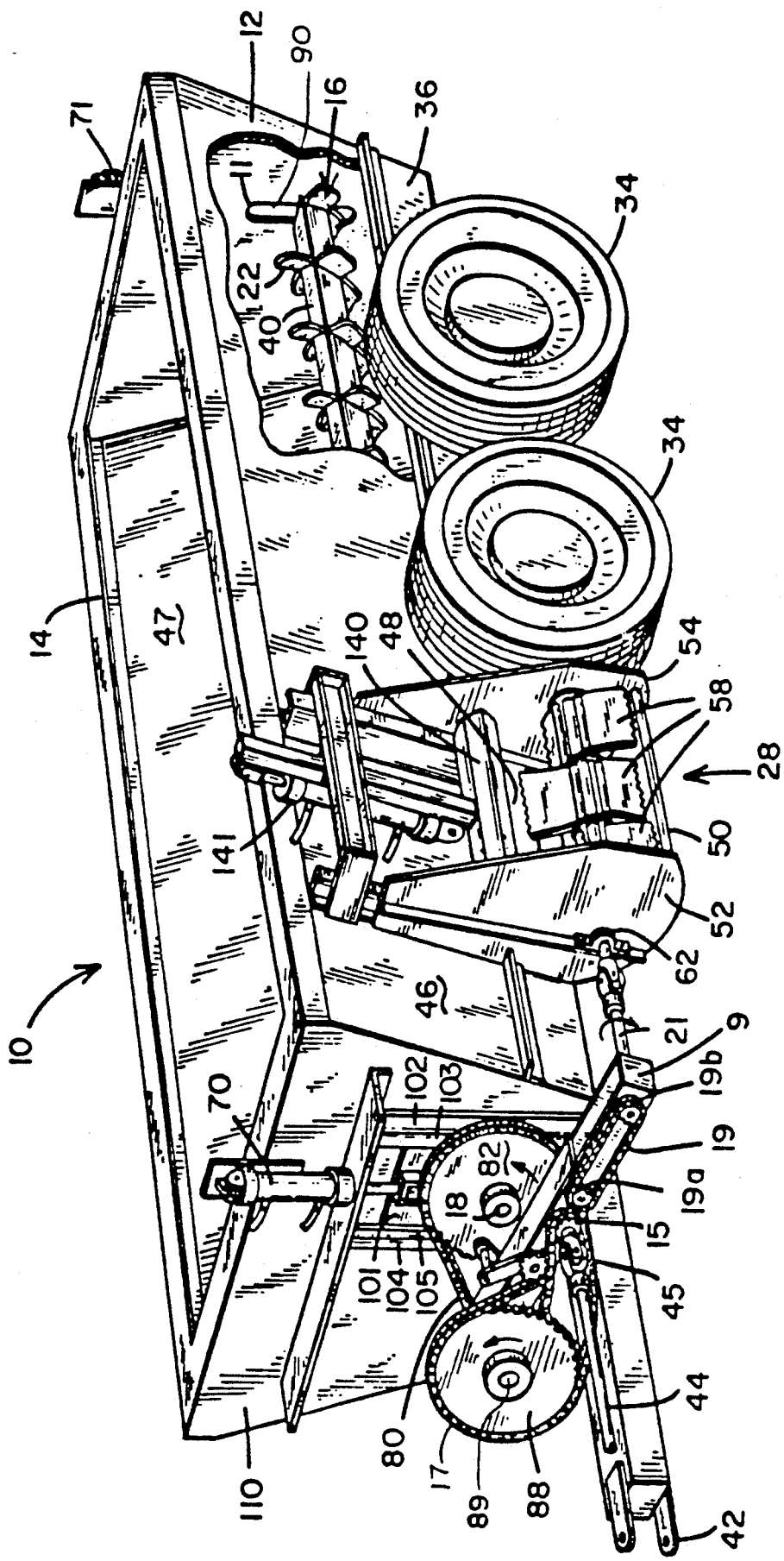
FIG. 1 is a front perspective view with a partial cut-away showing the manure spreader of the present invention.

Referring to FIGS. 1 and 2 reference numeral 10 generally designates a wheeled, tank-type body or container 12 having an open top 14 for dumping manure therein. Body 12 is generally V-shaped in configuration having a first inclined sidewall 47 and a second inclined sidewall 46 which is at greater inclination angle than the first sidewall 47. The V-shape funnels the manure to the bottom of tank body 12 where an auger conveyor 16 propels the manure to an outlet. Body 12 is carried upon a suitable, sturdy chassis 36 in a conventional manner. The chassis 36 is arranged for transporting over the field by employing a plurality of right and left wheels 34 mounted in pairs upon conventional axels 38 in a well known manner.

Manure spreader 10 in conventionally transported and powered by a tractor or other farm equipment (not shown). For example, a hitch 42 is illustrated in FIG. 1 for forming a towing connection to a tractor.

The power for operation of auger conveyor 16 is obtained from a chain drive mechanism that connects to the tractor power take off. The power take off of the tractor (not shown) delivers power through a rotating drive shaft 44 and a universal joint 45. Drive shaft 44 turns a small sprocket wheel 15 which is rotatably mounted in housing 9. A roller link chain 17 connects small sprocket wheel 15 to a larger sprocket wheel 88. Sprocket wheel 88 is mounted on a shaft 89, and on the rear of shaft 89 is a smaller sprocket wheel designated 81 in FIGS. 6 and 7. The smaller sprocket wheel axially connected to sprocket wheel 88 drives a larger sprocket wheel 82 through a roller link chain 80. Sprocket wheel 82 turns an auger conveyor shaft 18 that connects to a square shaft auger conveyor 16.

The power for operating side spreading mechanism 28 is similarly obtained from the tractor power take off. Located in housing 9 is a first sprocket wheel 15A (see FIG. 4A) that connects to power take off shaft 44 through universal joint 45. The first back sprocket wheel turns a second back sprocket wheel 19c (FIG. 4A) and is driven in a reverse angular direction. The second back sprocket wheel connects axially to sprocket wheel 19a to turn sprocket wheel 19a in a clockwise direction, as viewed in FIG. 1. Sprocket wheel 19a drives a sprocket wheel 19b through a roller link chain 19. Sprocket wheel 19b drives an impeller drive shaft 21 to rotate in the direction of arrow A in FIG. 4 the manure blades on impeller 58. The multiple sprocket and chain arrangement shown provides for speed reduction of the power take off to provide relatively slow speed rotation of auger conveyor 16 while permitting faster rotation of impeller 58 in the side spreading mechanism 28.

Figure 3:
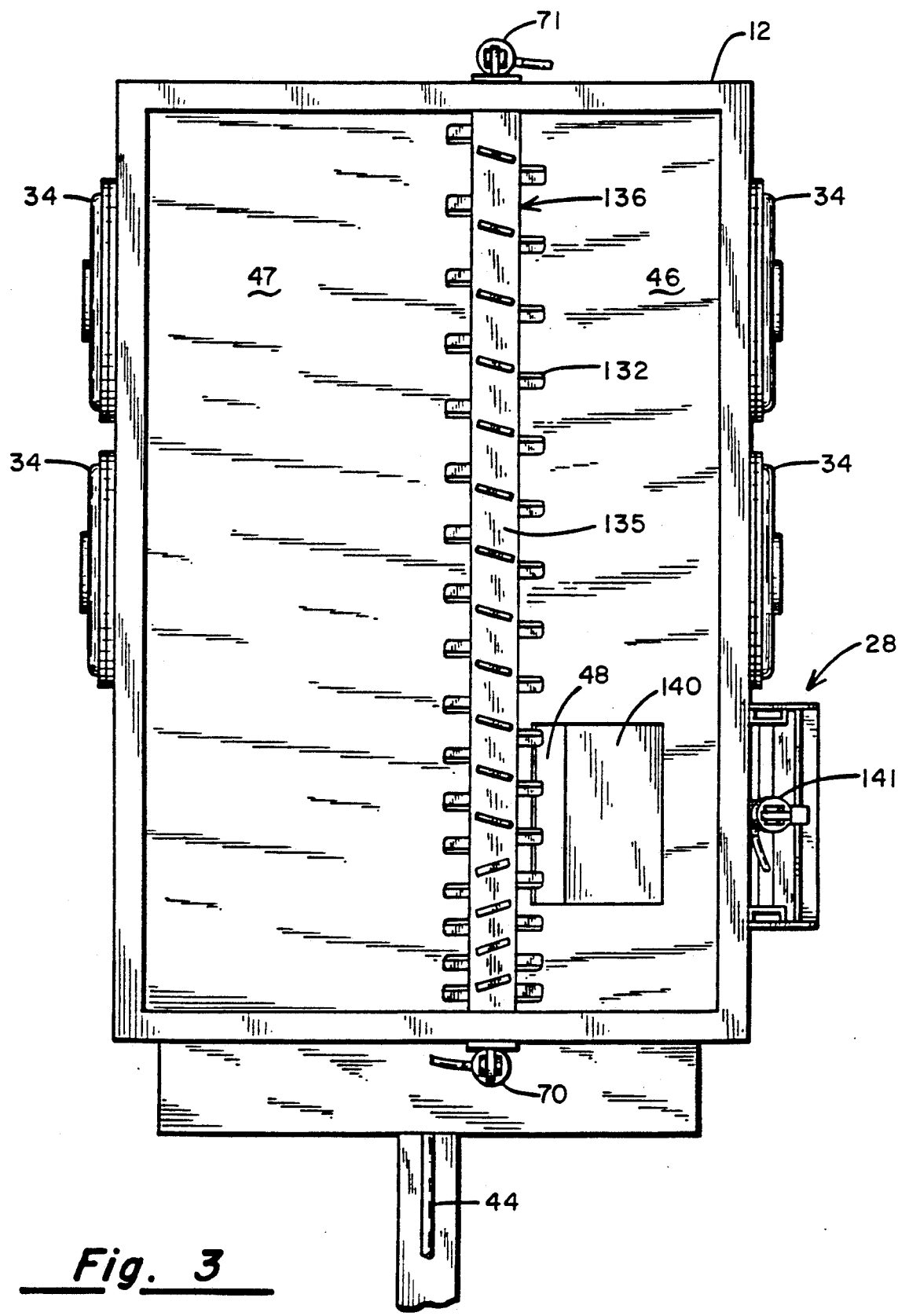
FIG. 3 is a top view showing the spreader and the interior of the tank.

FIG. 1 shows auger conveyor 16 longitudinally positioned in its normal use (i.e., conveying) position near the V-shaped bottom of body 12. FIG. 3, although of a different embodiment, illustrates the operative relationship of the auger conveyor of the present invention with the side outlet. Auger conveyor 16 which extends the entire length of body 12 is coupled to drive shaft 44 so that rotation of drive shaft 44 through tractor power take off (not shown) and sprocket wheels 15, 18, 82 produces rotation of auger conveyor 16 to propel the manure to an outlet 48 located in side wall 46. One end of auger conveyor shaft 18 is journalled within a conventional forward mounted bearing housing (not shown) and the other end of auger conveyor shaft is journalled within an identical conventional rearward mounted bearing housing 20. At the inside back end of the body 12 is an elongated slot 11 that permits raising and lowering the back bearing housing of auger conveyor 16. Similarly, there is an identical elongated slot (not shown) in the front of body 12 to permit raising and lowering of the front bearing housing of auger conveyor 16. It is this feature of raising and lowering auger conveyor 16 which can be used to break up bridging that may occur in body 12.

Auger conveyor 16 includes a square housing 40 having a plurality of individual blades 22, which are welded or otherwise secured to housing 40 in the configuration of a helix. The helix configuration of blades 22 permits one to auger the manure (not shown) within body 12 toward side outlet 48 located behind side spreading mechanism 28. In the preferred embodiment the pitch of the helix blades varies with the auger conveyor blades having a greater pitch near the discharge area. The variable pitch of an auger conveyor is illustrated in FIG. 3 which shows a round shaft auger conveyor of varying pitch. The spreader of FIG. 3 is identical to the spreader of FIG. 1 with the exception of the round shaft auger conveyor 136. For ease in apprehension, those parts which are identical in FIGS. 1 and 3 contain identical reference numerals. In addition, some of the identical spreader components have been left off of FIG. 3 since the purpose of FIG. 3 is to show the operative relationship of round shaft auger conveyor 136 in relation to tank 12. Round shaft auger conveyor 136 has a circular housing 135 with a plurality of individual blades 132 extending in four directions and arranged around housing 135 to form a helical pattern. FIG. 3 also shows sliding manure gate 140 for opening and closing a side manure outlet 48 in tank 12 through a hydraulic cylinder 141 which is controlled through the hydraulic system of the tractor (not shown). The side opening or side manure outlet 48 permits manure (not shown) contained within body 12 to be propelled by auger conveyor 16 to the outlet gate 48. With outlet gate 48 in the open position the manure onto a field.

Located on the front end of tank 12 is a hydraulic cylinder 70 and similarly located on the back end of tank 12 is a hydraulic cylinder 71. A set of hydraulic hoses (not shown) connect back hydraulic cylinder 71 and front hydraulic cylinder 70 to the hydraulic system of the tractor (not shown). Hydraulic cylinders 70 and 71 are double-acting cylinders so as to be operable to raise or lower auger conveyor 16.

Referring to FIGS. 1 and 4, side spreading mechanism 28 includes a spreader chamber that comprises a lower spreader chamber plate 40 which is welded or otherwise secured to spreader chamber sidewalls 52 and 54. Spreader chamber sidewalls 52, 54 and bottom plate 50 are also secured to spreader wall 46 through welding or the like to form a closed spreader chamber for receiving manure from tank 12. A multiple blade manure spreading impeller or spinner 58 is rotatably mounted in the spreader chamber through a conventional front bearing 62 located in spreader wall 52 and a conventional rear bearing 64 located in spreader sidewall 54.

The multiple blade manure spreading impeller comprises a three-part free-hinged multiple blade unit. Manure impeller 58 comprises a first set of four hinged blades 31, a second set of four hinged blades 32 and a third set of four hinged blades 33. The first set of blades 31 comprises four pivotably mounted blades that are spaced at 90° intervals with respect to each other on a driving shaft. Similarly, the second set of blades 32 comprises four pivotably mounted blades that are also located at 90° intervals with respect to each other. Likewise, the third set of individual blades 33 are spaced at 90° intervals with respect to each other. As each set of manure blades are identical, only one set of blades will be described. Each of the blades in the set has a slightly forward arc with a hinge on one end and a serrated edge on the opposite end. The arcuate shape of the manure blades provides a cupping action that assists in distributing the manure while the serrated edges shread the manure as the manure is fed into the rotating manure blades. The pivot hinge permits the manure blade to rotate forward or backward about a pivot connection in the impeller drive shaft housing.

In order to reduce peak horse power requirements each set of manure blades are rotationally offset from one another so that the bite of each blade into the manure fed from outlet 48 occurs at different times. Thus, with one revolution of the impeller there are sequential bites of manure which minimize the peak horse power requirements and also permit one to reduce the drive train size. FIG. 5 shows the offset blade feature with blades 31a, 31b, 31c and 31d spaced around shaft 62 at 90° intervals with respect to one another as are blades 32a, 32b, 32c, 32d and blades 33a, 33b, 33c and 33d.

In operation the three sets of blades which are mounted on a single impeller drive shaft 62 are rotated at a predetermined speed that is sufficient to generate centrifugal forces capable of forcing the blades to extend radially outward from the axis of rotation of impeller drive shaft 62. In the preferred arrangement the speed of rotation is maintained at sufficiently high speed so the impingement of manure being fed from auger conveyor 16 produces little if any backward deflection of the blades. FIG. 5 illustrates the radial extension of the blades and also shows the hinge or pivotal connection 31e, 31f, 31g and 31h of blades 31a–31d. The other sets of blades are similarly hinged to the impeller drive shaft 62. Note, the pivotal connection are spaced a distance X from the axis of rotation of impeller drive shaft 62. The radial displacement X which typically may be 2 to 4 inches allows the hinge of each of the blades to follow a circular path around the impeller drive shaft 62. As a result, the centrifugal forces on the individual blades force the blades to project substantially radially outward as shown in FIG. 5. Under the normal operating speeds the radially extending blades impinge on the manure fed therein to propel the manure outward in a spray pattern of up to sixty feet. However, if there should be frozen manure or rocks in the manure, the hinged manure blades can pivot backwards to permit the hinged manure blades 58 to disgorge the object damaging the blades or the spreader. This also eliminates shocks to impeller drive shaft 62 since solid objects will not lodge and abruptly stop the impeller drive shaft from rotating.

While three sets of multiple blades have been shown, one set of four hinged blades may also be used if the width of the side spreading mechanism is not too large. That is, four hinged blades that extend completely across side spreading mechanism 28 are useable for manure distribution since a hinged blade has a shock absorbing effect as the manure impinges on the blades. With four single blades extending across the side spreading mechanism there would be four bites of the manure per revolution as opposed to twelve bites with the three part impeller 58. If the blades are not hinged but fixed, the shock of manure impinging must be absorbed by the drive train which requires larger and heavier drive train. While less than four hinged blades may be used, it is preferred to have at least four blades to minimize peak horsepower requirements and maintain a good spreading pattern at normal power take off operating speed.

In operation of spreader 10 it has been found that the preferred mounting of side spreading mechanism 28 is on the sidewall 46 which has the steepest incline. Mounting side spreading mechanism 28 on the steepest sidewall has a beneficial effect since it brings side spreading mechanism 28 further off the ground to provide more ground clearance than if side spreading mechanism 28 were mounted on the shallow side or the side 47 with the lesser angle of inclination. Mounting side spreading mechanism 28 on the steep side also insures that when the outlet gate is opened manure drops into impeller 58 rather than over the top of the impeller. If manure falls over the impeller, it will not be spread.

To appreciate the relative scale of the proportion and speed of my spreader of a typical impeller 58 may have an outside diameter of 18 inches while the auger conveyor may have a 24 inch outside diameter. The normal or typical operating speed for impeller 58 is 820 rpm while the normal or typical rpm for auger conveyor 16 is 32 rpm. While faster or slower speeds or larger or smaller diameter could be used, one wishes to have sufficient rpm (and centrifugal force) on the impeller to hurl the manure in a far reaching spray pattern with the closer spread manure located in an area outside wheels 34 so that wheels 34 will not run into the freshly spread manure.

Figure 8:
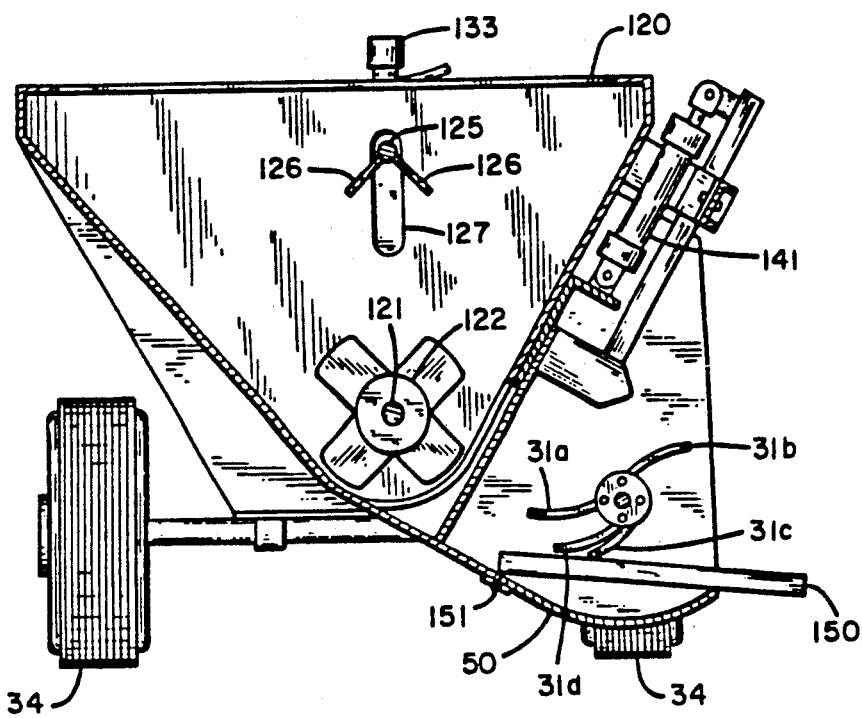
FIG. 8 is a partial cut-away view of an alternate embodiment of the present invention.

A further aspect of the pivotal manure blades in my impeller is that when the spreader is not in use the blades can be propped upward so they will not freeze to the bottom plate 50 of side spreading mechanism 28. It will be understood in order to prevent build-up of manure there is normally a small clearance between the end of spreader blades and the bottom plate 50. If there is liquid remaining in the spreader or on the blades after use, the small clearance may facilitate freezing of the blades to the bottom plate 58. To eliminate this problem the blades can be propped up by inserting an object such as a small board between plate 50 and the downward hanging blades. In addition, the hinged blades have minimal surface contact between sidewalls 52 and 54 and manure blades 31 and 33 since there are no end plates on manure blades 31 or 33 proximate sidewalls 52 and 54 as there are with closed type spinners. FIG. 8 illustrates how a small board 150 may be inserted under impeller 58 to prop the blades away from lower plate 50. The spreader of FIG. 8 also includes an elongated hinge 151 that permits bottom plate 50 to pivot down when not in use. If plate 50 is pivoted down, liquid residue cannot build up and freeze on plate 50. Either method may be used to prevent freeze up of blades 58.

Figure 6:
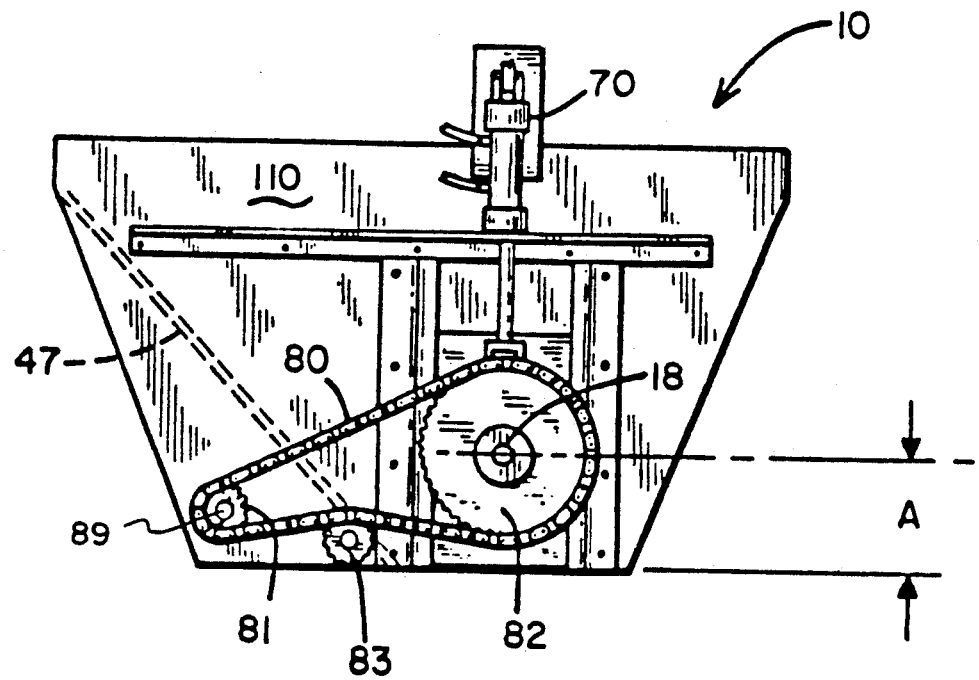
FIG. 6 is a partial rear elevational view showing an auger conveyor slide mechanism in a down position.
Figure 7:
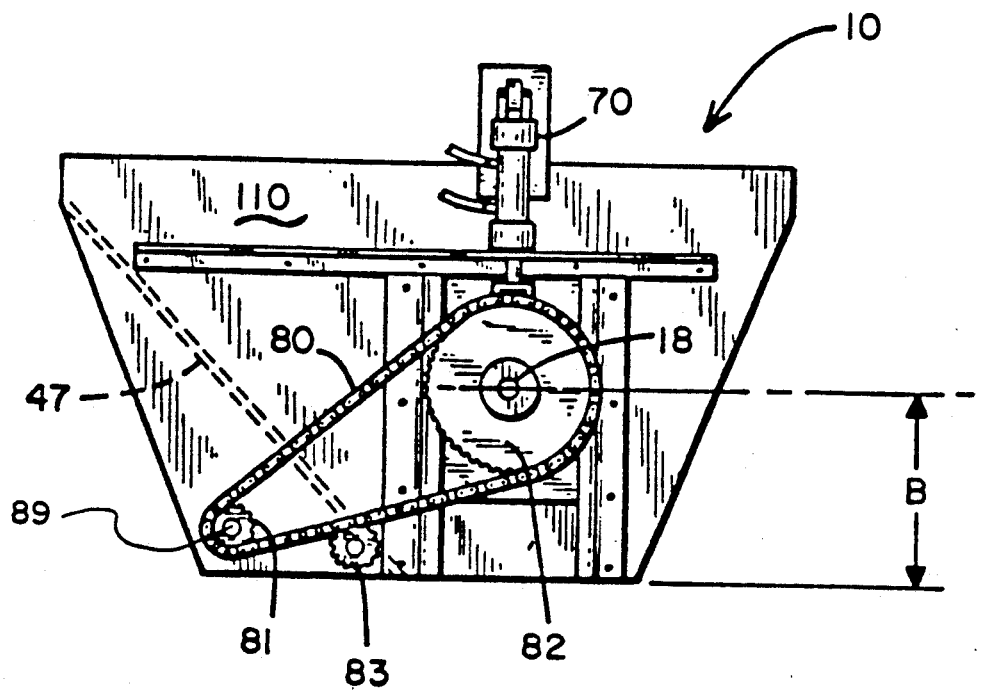
FIG. 7 is a partial rear elevational view showing the auger conveyor slide mechanism in an up position.

Referring to FIGS. 1, 2, 6 and 7 the means of breaking up the phenomenon of manure bridging is shown in greater detail. It should be understood that bridging is a phenomenon that occurs when manure to be spread is in chunks or almost paste-like chunks which causes the manure to adhere to itself and form a self-supporting bridge over the conveyor. The characteristics of such manure can be described a shard-park chunks of organic waste material that are held together by the materials in the waste material. As anyone who has attempted to remove hard-pack manure from an animal pen knows, the hard-pack manure must be cut or torn apart with great force to remove even a small chunk of manure. The problem is often more severe in manure spreaders where the container funnels the manure from a larger cross sectional area to a narrower cross sectional area. The hard-pack manure can bridge over an auger conveyor located at the bottom of the spreader, i.e., as manure chunks slide downward in the container under the force of gravity, they compact with other solid chunks of manure to form a self-supporting manure bridge over the auger conveyor which prevents the manure from being augered from the spreader. This problem mainly occurs when the manure is in solid chunks or paste-like. When the manure is in a liquid state or sufficiently nonviscous state where it cannot support its own weight, the force of gravity acting on the manure is usually sufficient to force the manure into the auger. In manure which is not hard-packed yet still susceptible to bridging my square shaft auger described in my aforementioned copending applications can be used as the square shaft auger will pulsate the manure load to prevent manure bridging. Thus the present invention is capable of handling manure which does not flow into the auger under the force of gravity or even from the pulsating action of a square shaft auger. The means for breaking up the self-supporting manure bridge comprises a first hydraulic cylinder 70 located on one end of spreader 10 and a second hydraulic cylinder 71 located on the opposite end of spreader 10. Hydraulic cylinders 70 and 71 are powered from the hydraulic controls of the tractor to raise and lower the rotating auger conveyor 16 within tank 12. To illustrate the displacement of the means for breaking up the bridging, FIG. 6 shows a partial front view of spreader 10 with auger shaft 18 in lower or normal operating position and FIG. 7 shows auger shaft 18 in the raised operating position. Note, roller link chain 80 connects the driving sprocket wheel 81 to the auger sprocket wheel 82 so that regardless of position auger conveyor 16 can be rotated. FIGS. 6 and 7 illustrate how sprocket wheel 83 which is mounted on the end of a spring action pivotal arm (not shown) takes up any slack in chain 80.

The back means to permit one to raise or lower the back end of auger shaft 18 in tank 12 is shown in detail in FIG. 2 and comprises a vertically slidable plate 90 that is held in position on one edge by lips 93 on plate 91 and on the opposite edge by lips 94 on plate 92. The lips provide only sufficient clearance for sliding plate 90 to slide up or down. A hydraulic cylinder extendible arm 95 connects to bearing housing 20 through a pivotal yoke connection 96. The front means for raising and lowering auger shaft 18 (FIG. 1) is identical to the rear means for raising and lowering the shaft and comprises a vertical sliding plate 101 that is held in a vertical slidable position on one edge by plate 102 and lip 103 and on the other edge by lip 105 on plate 104. Lips 103 and 105 also provide sufficient clearance to permit plate 101 to slide vertically. If desired, lubrication fittings can be mounted on the lips to facilitate lubricating the edges of the sliding plates. Lubrication of the slide area between the plates and lips has the added benefit in that it produces a better seal so that in the event the spreader is used with liquids the liquid will not run out of the spreader along the periphery of the plate.

To understand the operation of the bridge break-up mechanism reference should again be made to FIG. 6 which shows a partial front view of spreader 10 with auger shaft 18 spaced a distance A from the bottom of spreader 10. For ease in understanding, some of the components of spreader 10 have been left off of FIG. 6 and FIG. 7 as well as the view taken from a plane immediately in front of chain 80. In this position the manure in the spreader can be augered into the side spreading mechanism 28 shown in FIG. 1. If the manure flows freely into the auger, there is no need to raise or lower the auger, but should the manure bridge over the auger conveyor, the operator actuates the bridge breaking mechanism by supplying high pressure fluid to hydraulic cylinders 70 and 71 to raise rotating auger shaft 18. Raising rotating auger shaft 18 causes the auger blades to bite into the manure bridging over the auger. The continued rotation of the auger pulls the manure along the sides of the spreader where it falls below the auger. Lowering the rotating auger into the chunks of manure breaks up the manure and forces the manure to the outlet 48. Note, in the raised position the chain 80 permits power to be transferred from driving sprocket wheel 81 to sprocket wheel 82 without external adjustment as take up sprocket wheel 83 maintains the proper tension on chain 80. FIG. 7 shows the auger in the up position with the auger shaft spaced a distance B above the bottom of tank 12 with FIG. 6 showing the auger shaft raised to distance A. Without any limitation thereto we have found if the difference between A and B (B and A) is about four to 12 inches, we can eliminate virtually all bridging problems in a V-shaped body.

While the auger conveyor 16 is shown to move vertically up and down in tank 12, it can also be moved laterally as long as auger conveyor 18 is forced into the manure bridge. Thus, in some instances one may lift only one end of auger conveyor 18 to break up the bridging.

The bridge break up mechanism has an added benefit in that it extends the range of manures that can be spread with round shaft augers. Although a round shaft auger lacks the pulsating action that occurs with a square shaft auger, the raising and lowering of the round shaft through the hydrualic cylinder permits the use of round augers where heretofore only square shaft augers could be used.

Figure 9:
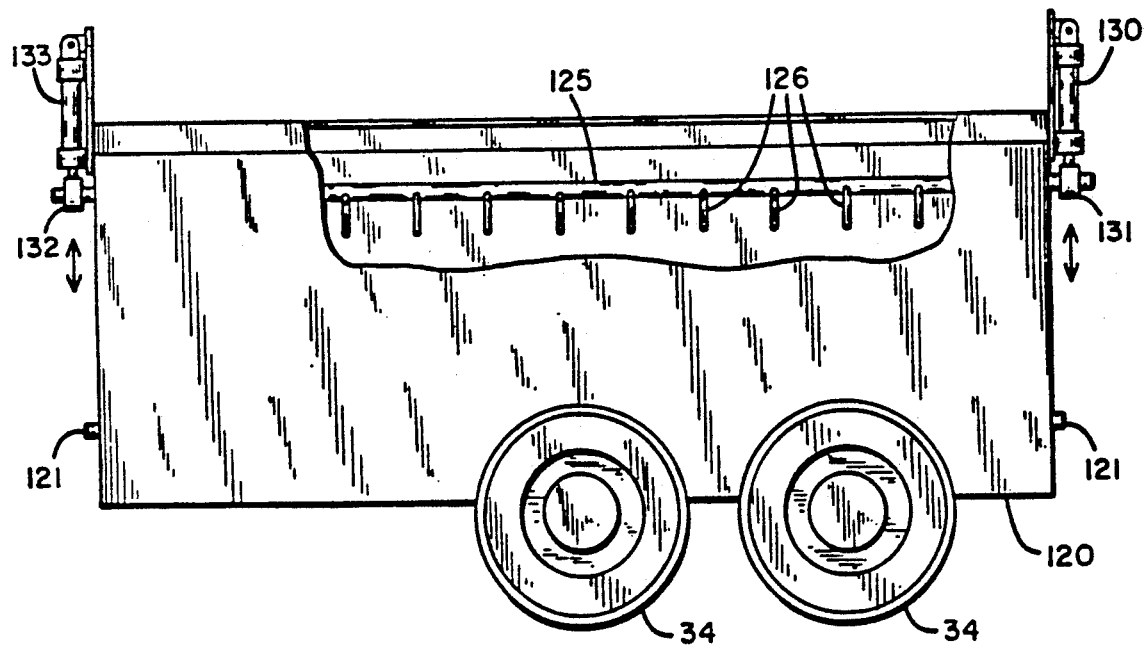
FIG. 9 is a partial cut-away view of the alternate embodiment shown in FIG. 8.

FIGS. 8 and 9 show an alternate embodiment of a means for breaking up the bridging in a spreader and also illustrates the inclined sidewalls used in the spreader. Spreader 120 is similiar to spreader 10 in that it comprises a generally V-shaped tank having an auger conveyor 122 located at the bottom of the tank. As the side spreading mechanism and drive mechanism are identical to those shown in spreader 10 of FIG. 1, they have been left out of FIG. 9 for purposes of clarity. Similarly, the drive mechanism has been left out of FIG. 8 for purposes of clarity.

Auger conveyor 122 in contrast to auger conveyor 16 of spreader 10 is not vertically positionable to break up any bridging in spreader 120. Instead, there is provided a bar 125 that extends longitudinally from one end of spreader 120 to the opposite end of spreader 120. Bar 125 contains a set of downward extending tines 126. One end of bar 125 connects to an extendible arm 131 of hydraulic cylinder 130 and similarly the opposite end of arm 125 connects to the extendible arm 132 of hydraulic cylinder 133. Bar 125 can be raised or lowered within a first vertical opening 125 located in one end of tank 120 and an identical vertical opening (not shown) located in the opposite end of tank 12. If desired, bar 125 can be rotated or oscillated.

Bar 125 operates similiar to the vertical positionable auger conveyor 16 in that bar 125 would normally be located in the lower position immediately above auger conveyor 122. When bridging occurs one merely actuates the hydraulic cylinders 130 and 133 to raise and lower bar 125 thus breaking up the bridging over auger conveyor 122.

While hydraulic cylinders are illustrated, other control mechanism could be used to raise or lower bar 125 of my auger conveyor shaft. For example, auger shaft displacement could be obtained by use of a cam and sprocket wheel to raise or lower the auger or shaft in response to rotation of the auger conveyor.

While my manure spreader has been described in its capabilities of having spreading hard-packed or chunk manure it is apparent that it can also hurl and spread manures that do not bridge, thus permitting my spreader to be used with a wide variety of manures including liquid manures. Although my spreader is shown and described as a towed unit, the spreader container and spreader mechanism are also suitable for mounting on a truck frame to produce a self-propelled spreader. If a truck is used, the spreader drive can be connected to run from a hydraulic system on the truck.

I claim:

1. In a manure spreader having an elongated hopper for storing manure to be spread, said hopper having downwardly and inwardly sloped side walls, the combination comprising: a conveyor auger having a shaft; means for mounting said auger at the bottom of said hopper for movement between a raised position and a lower position said auger conveying said manure to a discharge opening at a forward position in a side wall of said hopper when said auger is in the lower position; impeller means including a blade assembly mounted adjacent said side wall of said hopper to receive said manure passing through said discharge opening for imparting an overhead impact motion and spreading said manure to one side of said spreader; drive means for said auger including: an input drive shaft adapted to be connected to a power take-off shaft of a tractor, first chain drive means coupled to said input drive shaft for driving said auger in rotation while permitting said auger to be moved between said raised and said lower positions, second chain drive means coupled to said input shaft for driving said impeller means in rotation, and reversing drive means for reversing the direction of one of said auger and impeller means relative to the other.

2. The apparatus of claim 1 wherein said means for mounting said auger includes first and second hydraulic cylinders connected to respective ends of said auger for raising and lowering the same.

3. The apparatus of claim 1 wherein said reversing drive means comprises a first drive member on said input drive shaft and a second drive member coupled to said first drive member, whereby said second drive member rotates in a reverse angular direction relative to said first drive member.

4. The apparatus of claim 3 wherein said reversing drive means reverses the direction of rotation of said impeller means relative to the auger and characterized in that said auger rotates in the same angular direction as said input drive shaft.

5. The apparatus of claim 1 wherein said first chain drive means comprises: a relatively large first sprocket connected in driving to the shaft of said auger; a first chain entrained about said first sprocket; a second, smaller sprocket mounted on a shaft spaced laterally of said auger shaft and coupled thereto, said first chain being further entrained around said second sprocket; and chain take-up means engaging said first chain whereby said auger and said first sprocket may be raised and lowered by said hydraulic cylinders under drive and said chain take-up means will take up slack in said first chain.

6. In a manure spreader having an elongated hopper for storing manure to be spread, said hopper having downwardly and inwardly converging side walls, one of said side walls defining a discharge opening toward the forward portion thereof, the combination comprising: a conveyor auger having a shaft extending forwardly of said hopper; impeller means having an impeller shaft and a blade assembly mounted adjacent said one side wall of said hopper to receive manure passing through said discharge opening for imparting force in an overhand motion to spread said manure to one side of said spreader, said auger shaft and said impeller shaft rotating about respective parallel axes extending in the direction of travel of said spreader; and chain drive means for driving said auger and for driving said impeller means to impart said overhand motion to said manure, said chain drive means comprising: input shaft means adapted to be connected to a power take-off shaft of a tractor; first and second drive members spaced axially along said input shaft means; first chain drive means coupling one of said drive members with said impeller shaft for rotating the same; second chain drive means coupling said other of said drive members on said input shaft means with said auger shaft for driving the same and including speed reduction means comprising, at least one intermediate shaft parallel to said auger shaft and mounted laterally thereof, a first relatively large diameter sprocket on said intermediate shaft coupled to said second drive member of said input means and a smaller second sprocket on said intermediate shaft coupled on the forward end of said auger shaft, a third sprocket having a larger diameter than said second sprocket mounted to said auger shaft, a roller chain entrained around said second and third sprockets, and a chain take-up idler for reducing slack in said roller chain; and reversing drive means in one of said first and second chain drive means whereby one of said auger and impeller means rotates in the same direction as said input shaft means and the other of said auger and impeller means rotates in the opposite angular direction of said input shaft and characterized in that said auger rotates at a speed substantially slower than the rotational velocity of said impeller means.

7. The apparatus of claim 6 further comprising means for mounting the forward and rear ends of said auger to said hopper for permitting vertical movement of said auger under drive between a lower use position and a raised position; and first and second hydraulic cylinders, each having one end connected to said spreader and the other end connected to a respective end of said auger for raising and lowering said auger.

* * * * *

UNITED STATES PATENT AND TRADEMARK OFFICE
CERTIFICATE OF CORRECTION

PATENT NO. : 5,085,372
DATED : February 4, 1992
INVENTOR(S) : Mervin G. Martin

Page 1 of 2

It is certified that error appears in the above-identified patent and that said Letters Patent is hereby corrected as shown below:

Title Page:

Line 14, after "over", "the" should be deleted.

Col. 1, line 27, after "for", insert --use--; line 31 after "must", insert --first--; line 32, "processes" should be --processed--; and line 60, after "which", insert --range--.

Col. 2, line 57, "compacting" should be --compacted--.

Col. 3, line 63, after "first", insert --back--.

Col. 4, line 28, "the" should be deleted; line 36, after "square", insert --shaft--; and line 66, after "manure", insert --is fed into side spreading mechanism 28 which spreads the manure--.

Col. 5, line 65, "connection" should be --connections--.

Col. 6, line 10, after "object", insert --without--; and line 48, after "spreader", delete "of".

UNITED STATES PATENT AND TRADEMARK OFFICE
CERTIFICATE OF CORRECTION

PATENT NO. : 5,085,372

DATED : February 4, 1992

INVENTOR(S) : Mervin G. Martin

It is certified that error appears in the above-identified patent and that said Letters Patent is hereby corrected as shown below:

Claim 5, Col. 10, line 24, after "driving", insert --relation--.

Signed and Sealed this

Twenty-fifth Day of May, 1993

Attest:

MICHAEL K. KIRK

Attesting Officer

Acting Commissioner of Patents and Trademarks